(12) United States Patent  
Chen (10) Patent No.: US 12,107,918 B2
(45) Date of Patent: Oct. 1, 2024

(54) SYSTEM FOR USE IN A CLOUD-STORAGE BLOCK CHAIN SOLUTION

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 141 days.

(21) Appl. No.: 17/901,876

(22) Filed: Sep. 2, 2022

(65) Prior Publication Data

US 2024/0080361 A1    Mar. 7, 2024

(51) Int. Cl.
*H04L 67/1097* (2022.01)
*G06F 16/182* (2019.01)
*H04L 67/104* (2022.01)
*H04L 67/1095* (2022.01)

(52) U.S. Cl.
CPC ...... *H04L 67/1097* (2013.01); *G06F 16/1834* (2019.01); *H04L 67/104* (2013.01); *H04L 67/1095* (2013.01)

(58) Field of Classification Search
CPC ............... H04L 67/1097; H04L 67/104; H04L 67/1095; G06F 16/1834
See application file for complete search history.

(56) References Cited

U.S. PATENT DOCUMENTS

| | | | |
|---|---|---|---|
| 11,354,286 B1* | 6/2022 | Pusukuri | G06F 16/285 |
| 11,593,825 B2* | 2/2023 | Gollner | H04W 4/02 |
| 11,921,682 B2* | 3/2024 | Oberhofer | G06F 16/254 |
| 2014/0279893 A1* | 9/2014 | Branton | G06F 16/904 707/634 |
| 2020/0396065 A1* | 12/2020 | Gutierrez-Sheris | H04L 9/3297 |
| 2022/0230078 A1* | 7/2022 | Matlick | G06N 5/04 |

FOREIGN PATENT DOCUMENTS

WO    WO-2021102572 A1 *    6/2021    ...... G06F 16/214

\* cited by examiner

*Primary Examiner* — Tarek Chbouki (57) ABSTRACT

A system for a decentralized cloud-storage solution operated within a P2P network. The decentralized cloud-storage solution includes a system and specific operations that not only performs data-classification analysis on an end-user's data, but also enhances a data-distribution mechanism with route distances related to geographical factors and facilitates a block-chained technology implemented for decentralized cloud storages; thereby reducing the risks on data storage and facilitating a user's big data transactions through a shared P2P network.

9 Claims, 9 Drawing Sheets

SYSTEM FOR USE IN A CLOUD-STORAGE BLOCK CHAIN SOLUTION

BACKGROUND OF THE INVENTION

1. Field of the Invention

The present invention relates to a decentralized cloud-storage solution, and in particular, to a system with specific operations for use in a cloud-storage block chain solution; and also provides a P2P (peer to peer)-network route-distance analysis mechanism to optimize distributions of data storage to be relative with geographical factors.

2. Description of the Related Art

As the era of huge-data communication arrives, users need more creative methodologies to counter issues of data-classification analysis and data cloud storage, especially to utilize a shared network to deal with decentralized data sharing requirements. For the purpose of supporting such requirements, implementations of edge computing workstations, data centers in the cloud, and CDN (content distribution network) mechanisms are usually upgraded or established. Most of the current shared network solutions take many risks on centralized storage and higher expenses for data transactions with heavy storage apparatuses.

Therefore, it is desirable to develop a decentralized cloud-storage solution with a system and specific operations to reduce storage risks, offload data-classification analysis from data centers, and facilitate sharing decentralized data through a P2P network.

BRIEF SUMMARY OF THE INVENTION

In view of the drawbacks of the prior art, it is an object of the present invention to provide a decentralized cloud-storage solution operating within a P2P network. The decentralized cloud-storage solution includes a system and specific operations not only to perform data-classification analysis on an end-user's data, but also to enhance a data-distribution mechanism which is relative with geographical factors and to facilitate a block-chained technology implemented for decentralized cloud storages; thereby reducing the risks on data storage and facilitating user's big data transactions through a shared P2P network.

To achieve the above objects and more, the present invention provides a system for use in a cloud-storage block chain solution to implement a P2P network with a plurality of end-user nodes; wherein the end-user nodes provide chained cloud-storage blocks as data-storage units while end-user data stored in a cloud-storage block can be downloaded by an end-user node of the P2P network in accordance with an identified location of the cloud-storage block. To implement such a P2P network, the end-user node basically comprises a tree-structured database, a data-ledger module, a user-data processing module, a consensus computing module, a CPU-control module, and a data-classification analysis engine.

The tree-structured database is a NoSQL database with a schema in the form of JavaScript Object Notation (JSON) for collaborating with a consensus mechanism wherein the NoSQL database is also coupled to a relational database which is especially specified to deal with transactional records (for example, a NewSQL database). The data-ledger module implements a shared information-fuel ledger for data transactions. The user-data processing module is for processing the user data via driving a single thread to perform a data-classification-analysis process on the user data. The consensus computing module determines an information-fuel consumption for a data transaction, and also collaborates with a shared hash table, a shared route-distance table and an output of the data-classification-analysis process to determine which cloud-storage block is for storing the user data. The CPU-control module facilitates configuration of a specific efficient core to collaborate with the user-data processing module for performing the data-classification-analysis process and the data transactions. Besides, the data-classification analysis engine is specified to implement the above-mentioned data-classification-analysis process.

It is to be noted that the mentioned modules in the present invention are equivalent to a set of software libraries or instructions formed with a plurality of compiled functions executed by a processor and can be re-accessed for performing a series of processes step by step. Moreover, in some embodiments, the mentioned engines are meant to be a set of loadable software libraries or compiled instructions with coded algorithm stored in a non-volatile memory to be executed by a micro control unit which can be driven by an active system.

In order to implement the above-mentioned data-classification-analysis process, the data-classification analysis engine provided by the present invention further supports the following operations: a) labeling attributes for each user data; b) performing a machine-learning kit for facilitating derivation of an output of data classification; c) performing a clustering-analysis kit for facilitating derivation of an output of data classification; d) performing a principal-component-analysis kit for facilitating derivation of an output of data classification; and e) performing a k-nearest-neighbor computing kit for facilitating derivation of an output of data classification. Such data-classification analysis engine will be installed on the system of an end-user node or be connected to an end-user node for performing the data-classification-analysis process in the background system. Thereby the system drives the user-data processing module collaborating with the CPU-control module to utilize the data-classification analysis engine for processing the user data, and stores the processed user data in a cloud-storage block implemented by the tree-structured database while the cloud-storage block is also maintained by the data-ledger module and the consensus computing module.

Moreover, in the same embodiment, in order to implement chained cloud-storage blocks within the P2P network, the tree-structured databases in the P2P network are linked with each other via UDP transmission-layer protocol. Each tree-structured database is installed in a storage media implemented by non-volatile memories (such as SSD, or NAND Flash module) and also provides a chained cloud-storage mechanism with the following operations: a) setting up a tree-structured topic hierarchy for a selected database; b) expressing a location of a data stored in the selected database with a shared URL (Uniform Resource Locator) which is a relative position in the selected database; c) deriving a shared URI (Uniform Resource Identifier) according to the shared URL through a consensus mechanism, wherein the shared URI is an absolute position of the data stored in the selected database in the P2P network; d) deriving a shared URI hash value through a quantum hash function as a location ID for a data located in a chained cloud-storage block, wherein the quantum hash function provided by the consensus mechanism adopts a quantum random number as an input parameter to perform a random oracle model thereby deriving a corresponding shared hash table; e) requesting a number of information fuel according to the consensus mechanism for an end-user node of the P2P network when its tree-structured database accepts an uploading data transaction; f) collaborating with the consensus mechanism to update the shared hash table and the shared route-distance table when an end-user node is deleted from the P2P network, and g) collaborating with the relational database which is especially specified to deal with transactional records when a data transaction is completed or updated.

Further, in an embodiment, in order to maintain the chained cloud-storage blocks in a decentralized way, besides maintaining a copy of the shared information-fuel ledger, each data-ledger module of the present invention in an end-user node of the P2P network comprises a copy of the shared hash table for the stored data and a shared route-distance table for the active end-user nodes. Moreover, the data-ledger module also provides a decentralized data-ledger mechanism with the following operations: a) utilizing mutex locks for synchronization of the decentralized data-ledger mechanism; b) generating a random nonce as a parameter of a hash function to derive ledger IDs for each copy of the shared information-fuel ledger, the shared hash table for the cloud-stored data, or the shared route-distance table; c) collaborating with the consensus mechanism to maintain a storage record of the P2P network with the shared hash table, to maintain an information-fuel consumption record of the P2P network with the shared information-fuel ledger, and to maintain routing information of the P2P network with the shared route-distance table; d) updating the shared URIs and corresponding shared URI hash values onto the shared hash table; e) updating route distances for the end-user nodes of the P2P network onto the shared route-distance table, wherein a route distance is an administrator distance derived by a distance-vector algorithm coupled to an IGP (Interior Gateway Protocol), thus the route distance will be capable of optimizing distributions of data storage to be relative with geographical factors; and f) providing a quantum-digital-signature mechanism for data authentication, wherein the quantum digital signature is a digital fingerprint which adopts a hash value derived with a quantum random number as an input parameter of a hash function. Thereby the data related to user's shared data, information-fuel consumption records, or route distances for user's transactions (such as data-uploading transactions and data-downloading transactions) will be maintained by all of the end-user nodes together within the shared P2P network in a decentralized manner. Integrating the above operations into a decentralized data-ledger mechanism not only supports to establish a quantum block chain as a decentralized storage solution in cloud, but also facilitates a global enterprise to set up a private cloud through an efficient way over a plurality of geographical zones, thereby performing data sharing and storage. This is an effect that cannot be achieved by prior arts.

Moreover, in an embodiment, in order to facilitate data-downloading transactions between the end-user nodes of the P2P network, wherein each end-user node also provides a data downloading mechanism with the following operations: a) each end-user node maintaining a message queue for downloading data from a chained cloud-storage block located in a remote end-user node of the P2P network; b) sending a request to the P2P network for data downloading with a corresponding shared URI hash value referred from the copy of the shared hash table provided by the data-ledger module; c) each end-user node looking up the copy of the shared hash table to determine whether the corresponding storage location of the received shared URI hash value is in the local tree-structured database; d) extracting a data from the local tree-structured database according to a corresponding shared URL when determining that the corresponding storage location of the received shared URI hash value is in the local tree-structured database, and then packaging the extracted data in the form of a message (for example, a form comprising a descriptor followed by stored data slices); and e) pushing the message to a message queue maintained by a remote end-user node wherein the remote end-user node is the right one which just sent out a corresponding request for data downloading transaction. Thereby, a data downloading mechanism of the present invention is implemented for each end-user node via leveraging the data-ledger modules, the tree-structured databases within the P2P network and the message queues bundled with the end-user nodes of the shared P2P network.

Moreover, in the same embodiment, in order to facilitate data-uploading transactions between the end-user nodes of the P2P network, the user-data processing module of each end-user node also provides a data processing mechanism with the following operations: a) temporarily storing a user data in a virtual hard disk; b) triggering a single thread to execute a data-classification analysis process for a temporarily stored user data which is configured to be uploaded to a chained cloud-storage block of the P2P network; c) collaborating with a consensus mechanism to derive a shared URL according to the output of a data-classification analysis process wherein the shared URL is for expressing a corresponding data classification with topic hierarchy; d) triggering a single thread to execute a data-slicing process for the temporarily stored user data after deriving its shared URL thereby getting a plurality of decentralized data slices; and e) collaborating with a consensus mechanism to derive corresponding shared URIs and shared URI hash values for the decentralized data slices; wherein the shared URI comprises the corresponding shared URL and the shared URI also points out a position on the P2P network where the position is for storing the corresponding decentralized data slice in a chained cloud-storage block. Thereby an end-user data to be uploaded will be distributed to a proper cloud-storage block chained within a shared P2P network after performing a proper data-classification analysis process.

Still in the same embodiment, in order to detect a tamper event on the shared P2P network in time, wherein the user-data processing module of each end-user node further provides a tampering-resistance mechanism with the following operations: a) collaborating the data-ledger module to maintain a data transaction record of the tree-structured database in the local end-user node with data fingerprints in the form of hash values; and b) providing distinguishing initial-vector algorithms to the data transaction record of the tree-structured database in the local end-user node and the corresponding data stored in the chained cloud-storage block; thereby the user-data processing module is capable of detecting a tamper event in time via checking the data fingerprints periodically.

For most of embodiments, from the view of a user-data processing module, there are advanced inter-operations related to the tree-structured database, the data-ledger module, and the consensus mechanism of the shared P2P network. For example, after collaborating with a consensus mechanism, once the output of the consensus mechanism shows that the data slice to be uploaded has already been saved in a tree-structured database of the shared P2P network, the corresponding data-uploading transaction will be canceled by the user-data processing module, and the local end-user node will get a corresponding shared URI hash value of the save data slice from the consensus mechanism coupled to the data-ledger module. However, once the output of the consensus mechanism shows a brand-new shared URI hash value for the data slice to be uploaded, the corresponding local end-user node will get a specified number of information-fuel through the consensus mechanism and each copy of the shared hash table maintained by each data-ledger module within the P2P network will be updated.

Further, in some embodiments, in order to support routines for multiple cloud-storage chains within a P2P network, the consensus computing module of each end-user node performs a consensus mechanism with the following operations: a) collaborating with the CPU-control module to determine a maximum number of end-user nodes for the P2P network; b) collaborating with the tree-structured database to determine a maximum number of cloud-storage block chains for the P2P network; c) collaborating with the data-ledger module to determine whether a decentralized data slice is already stored in a chained cloud-storage block; d) determining which chained cloud-storage block is arranged for a specified decentralized data slice in accordance with both of a corresponding shared URL provided by the user-data processing module and the shared route-distance table; e) planning a position of a selected tree-structured database for the specified decentralized data slice in accordance with both of the corresponding shared URL and a block-ID of the arranged chained cloud-storage block wherein the block-ID is in the form of a hash value, and according to the planned position, deriving a shared URI and its corresponding shared URI hash value; f) determining an information-fuel consumption of an uploading requirement according to data size of the decentralized data slice and a corresponding route distance; g) determining an information-fuel consumption of a downloading requirement according to the data size of a stored decentralized data slice and a corresponding route distance; and h) determining an information-fuel bonus for an end-user node according to data size of a decentralized data slice and a corresponding route distance, wherein the end-user node provides a chained cloud-storage block to save the uploaded decentralized data slice in its tree-structured database. Thereby each end-user node can be operated with multiple cloud-storage chains within a shared P2P network according to available system resources.

Moreover, in an embodiment, in order to facilitate efficiency and security for running the cloud-storage chain solution, the CPU-control module of each end-user node provides an auto-controller mechanism with the following operations: a) configuring distinguishing CPU cores for different cloud-storage block chains within a P2P network; b) running distinguishing data-classification-analysis processes for different cloud-storage block chains within a P2P network, wherein each data-classification-analysis process is performed in the background by a resident single thread bundled to an efficient core; c) collaborating with the user-data processing module to keep a thread for running the data-slicing process so as to get a plurality of decentralized data slices and then temporally storing the decentralized data slices in a virtual memory located in a local disk partition; d) performing RLPx encryption on each decentralized data slice before the decentralized data slice is uploaded to a chained cloud-storage block; e) providing distinguishing RLPx keys for different cloud-storage block chains within a P2P network; and f) determining whether a decentralized data slice to be downloaded is stored in a chained cloud-storage block maintained by a remote end-user node according to a corresponding shared URI hash value.

Further, in some specific embodiments, in order to facilitate effects of a data-classification analysis engine with a clustering-analysis kit, the clustering-analysis kit supports the following operations: a) selecting a plurality of attributes labeled by the data-classification-analysis process, wherein the selected attributes are applicable to be distinguishing characteristic factors; b) deriving a plurality of data means (implemented as mean vectors) and data variations (implemented as a covariance matrix) according to the distinguishing characteristic factors thereby deriving a plurality of distinguishing Gaussian distributions; and c) utilizing the derived distinguishing Gaussian distributions (coupled to mixture weights for implementation) to set up a plurality of applicable Gaussian Mixture Models (GMMs), thereby facilitating a data to be treated as a specific distribution expressed by one of the applicable Gaussian Mixture Models.

DETAILED DESCRIPTION OF THE INVENTION

To facilitate understanding of the objects, characteristics, dataflow and effects of this present disclosure, embodiments together with the attached drawings for the detailed description of the present disclosure are provided.

A plurality of embodiments in regard to a system with specific operations for use in a cloud-storage chain solution are provided as follows. In some embodiments, this invention is implemented as an agent system for end-user nodes of a shared P2P (peer-to-peer) network with technology in the combination of tree-structured databases, route-distance estimation, data-classification analysis, consensus mechanism, and CPU management. Accordingly, through introducing a UDP transmission-layer protocol into the shared P2P network composed of the above-mentioned technologies, a lightweight agent system will be capable of supporting multiple block chains to provide a decentralized cloud-storage solution fitting to geographical distributions.

Figure 1A:
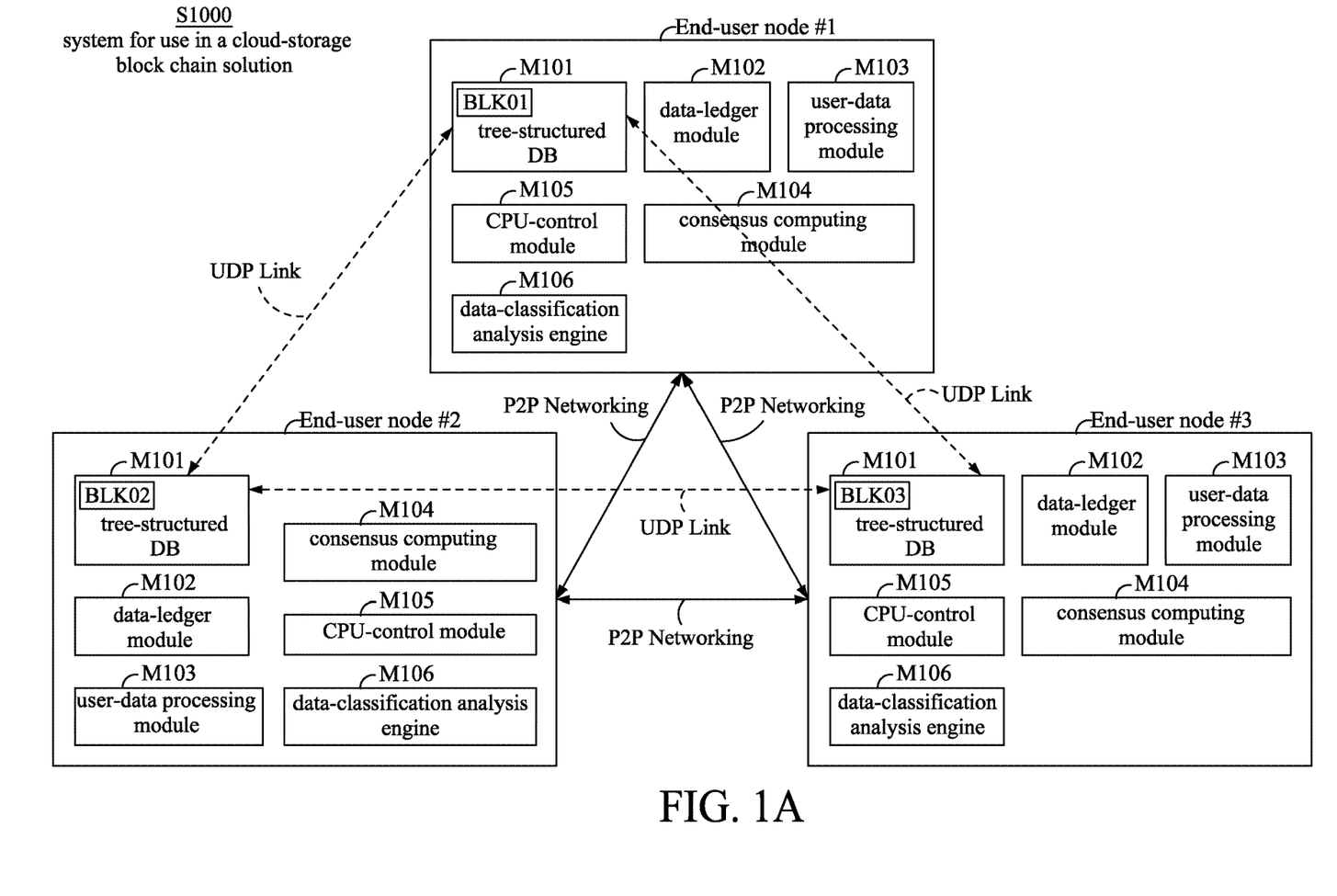
FIG. 1A is a structural block diagram of a system for use in a cloud-storage block chain solution.

Referring to FIG. 1A, in some embodiments, this technology provides a system S1000 for use in a cloud-storage block chain solution to implement a P2P network with a plurality of end-user nodes (shown as End-user Node #1—End-user Node #3 in FIG. 1A); wherein the end-user nodes provide chained cloud-storage blocks (shown as BLK01~BLK03 within each End-user Node) as data-storage units while an end-user data stored in a cloud-storage block (for example, in BLK01) can be downloaded by an end-user node of the P2P network (for example, by End-user Node #2) through UDP transmission-layer links in accordance with an identified location of the cloud-storage block.

Figure 1B:
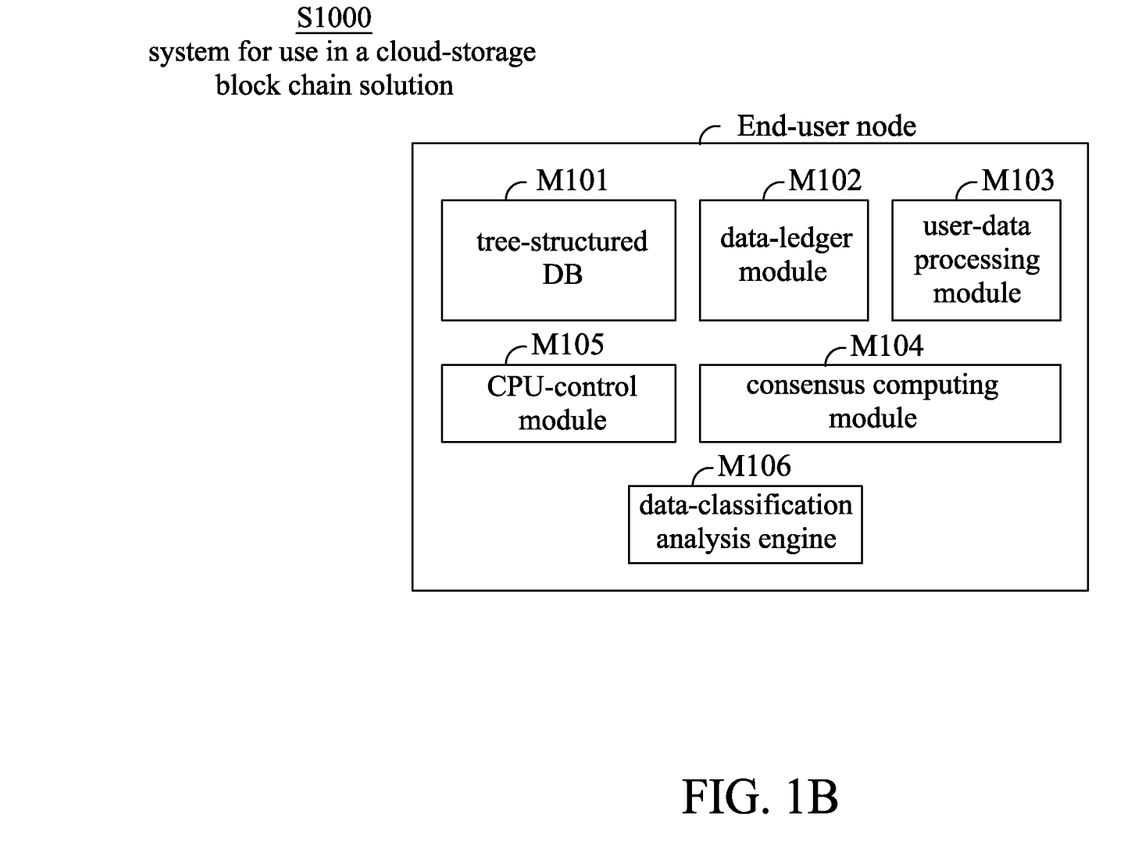
FIG. 1B is a structural block diagram of an end-user node within a system for use in a cloud-storage block chain solution.

Referring to FIG. 1B, to implement such a P2P network, the end-user node basically comprises a tree-structured database M101, a data-ledger module M102, a user-data processing module M103, a consensus computing module M104, a CPU-control module M105, and a data-classification analysis engine M106.

The tree-structured database M101 is a NoSQL database with a schema in the form of JSON for collaborating with a consensus mechanism wherein the NoSQL database is also coupled to a relational database which is especially specified to deal with transactional records (for example, a NewSQL database). The data-ledger module M102 implements a shared information-fuel ledger for data transactions. The user-data processing module M103 is for processing the user data via driving a single thread to perform a data-classification-analysis process on the user data. The consensus computing module M104 determines an information-fuel consumption for a data transaction, and also collaborates with a shared hash table, a shared route-distance table and an output of the data-classification-analysis process to determine which cloud-storage block is for storing the user data. The CPU-control module M105 facilitates configuration of a specific efficient core to collaborate with the user-data processing module M103 for performing the data-classification-analysis process and the data transactions. Besides, the data-classification analysis engine M106 is specified to implement the above-mentioned data-classification-analysis process.

Figure 1C:
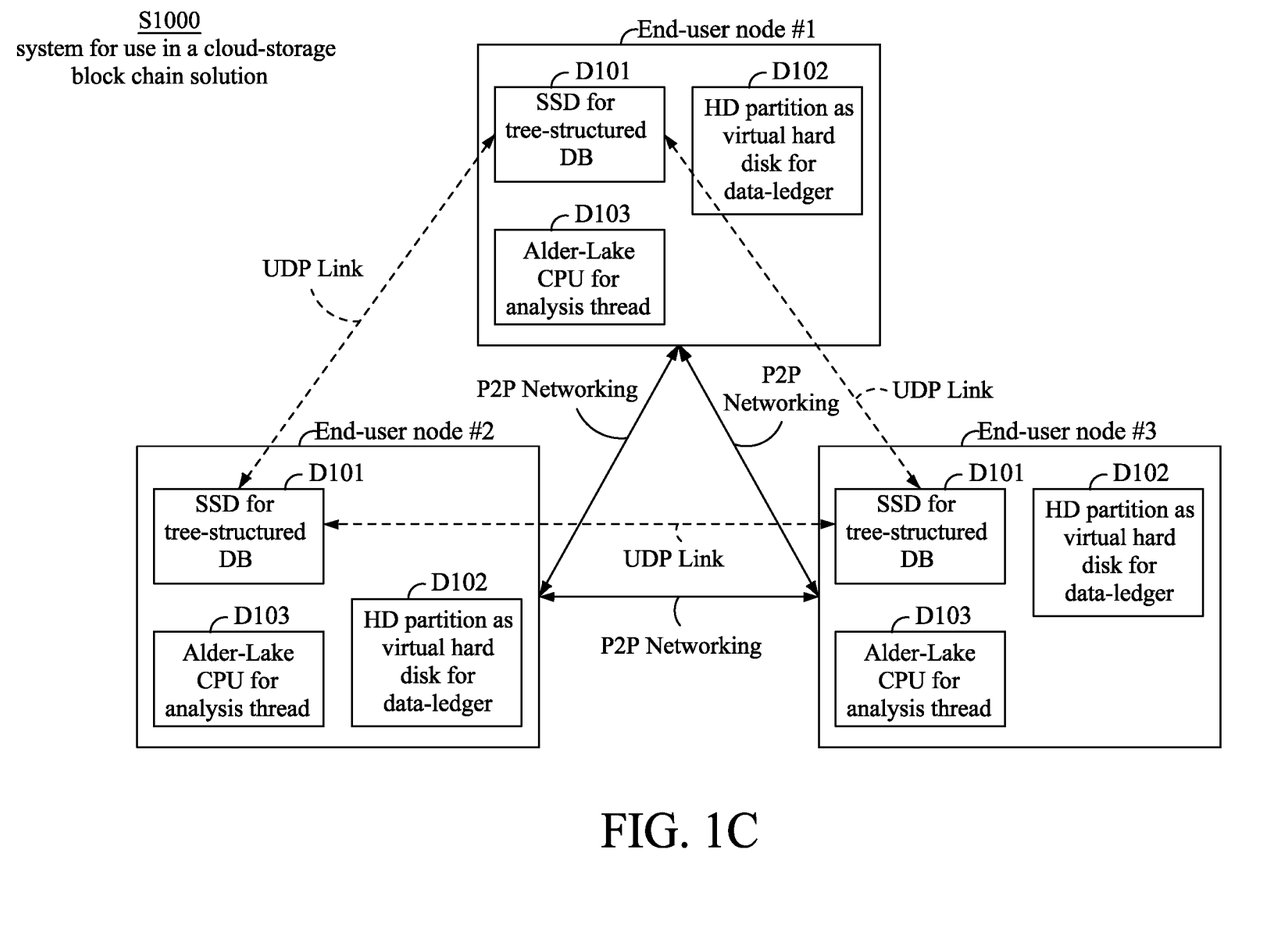
FIG. 1C is a structural block diagram of a user scenario to implement a system for use in a cloud-storage block chain solution.

Also refer to FIG. 1C, which is a structural block diagram of a user scenario to implement a system for use in a cloud-storage chain solution. In an embodiment of such user scenario, the present invention is implemented as an agent system S1000 running on each end-user node (such as End-user Node #1-End-user Node #3 shown in FIG. 1C) of a P2P network; wherein the system S1000 is capable of integrating the following specified hardware components such as: a set of non-volatile memories for installing tree-structured databases (for example, adopting SSD modules shown as block D101 in FIG. 1C), a partition of a hard disk as a virtual hard disk (for example, VHD shown as block D102 in FIG. 1C) for maintaining the data-ledger module, and a CPU with an efficient core which is especially fitting for running in the background (for example, like an Intel Alder-Lake CPU shown as block D103 in FIG. 1C). Each tree-structured database is configured as a cloud-storage block, and each cloud-storage block is linked with each other through UDP transmission-layer protocol.

Figure 1D:
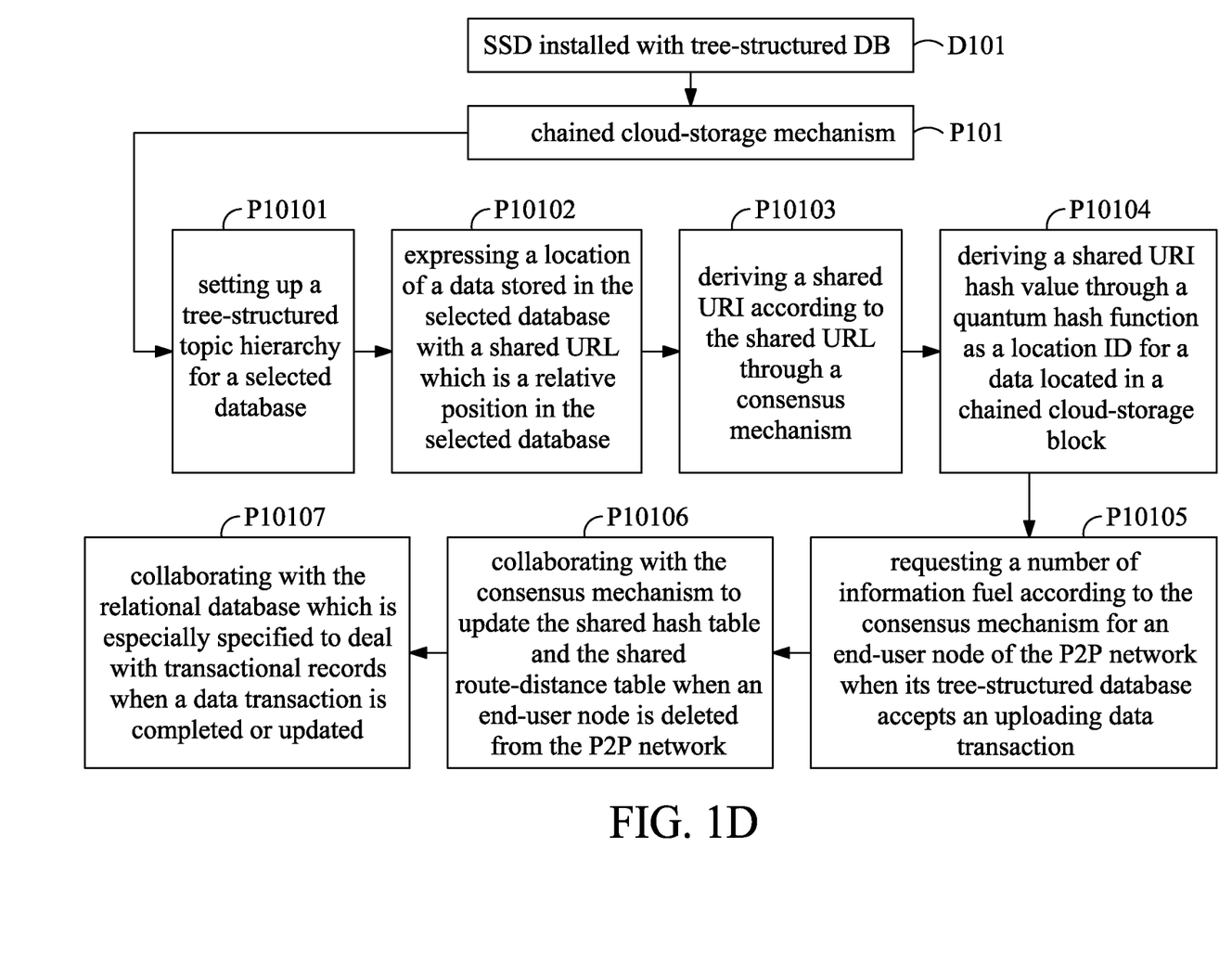
FIG. 1D is a dataflow diagram showing how the chained cloud-storage mechanism of the present invention is implemented.

Further, also referring to FIG. 1C along with FIG. 1D, in an embodiment for the above-mentioned user scenario, in order to implement chained cloud-storage blocks within the P2P network, the tree-structured databases in the P2P network are linked with each other via UDP transmission-layer protocol. Each tree-structured database installed in an SSD (solid-state drive) D101 also provides a chained cloud-storage mechanism (as shown in block P101 of FIG. 1D) with the following operations: a) as shown in block P10101 of FIG. 1D, setting up a tree-structured topic hierarchy for a selected database (for example, . . . /web/content/audio/ . . . , . . . /web/content/video/mp4/ . . . , . . . /web/content/vi deo/wmv/ . . . , etc.); b) as shown in block P10102 of FIG. 1D, expressing a location of a data stored in the selected database with a shared URL which is a relative position in the selected database (for example, file://localhost/db-root/web/content/audio/mp3/); c) as shown in block P10103 of FIG. 1D, deriving a shared URI according to the shared URL through a consensus mechanism, wherein the shared URI is an absolute position of the data stored in the selected database in the P2P network (for example, https://storage-block-001/db-root/web/content/audio/mp3/resource-0012.mp3); d) as shown in block P10104 of FIG. 1D, deriving a shared URI hash value through a quantum hash function as a location ID for a data located in a chained cloud-storage block, wherein the quantum hash function provided by the consensus mechanism adopts a quantum random number as an input parameter to perform a random oracle model thereby deriving a corresponding shared hash table; e) as shown in block P10105 of FIG. 1D, requesting a number of information fuel according to the consensus mechanism for an end-user node of the P2P network when its tree-structured database accepts an uploading data transaction; f) as shown in block P10106 of FIG. 1D, collaborating with the consensus mechanism to update the shared hash table and the shared route-distance table when an end-user node is deleted from the P2P network, and g) as shown in block P10107 of FIG. 1D, collaborating with the relational database which is especially specified to deal with transactional records when a data transaction is completed or updated.

Figure 2A:
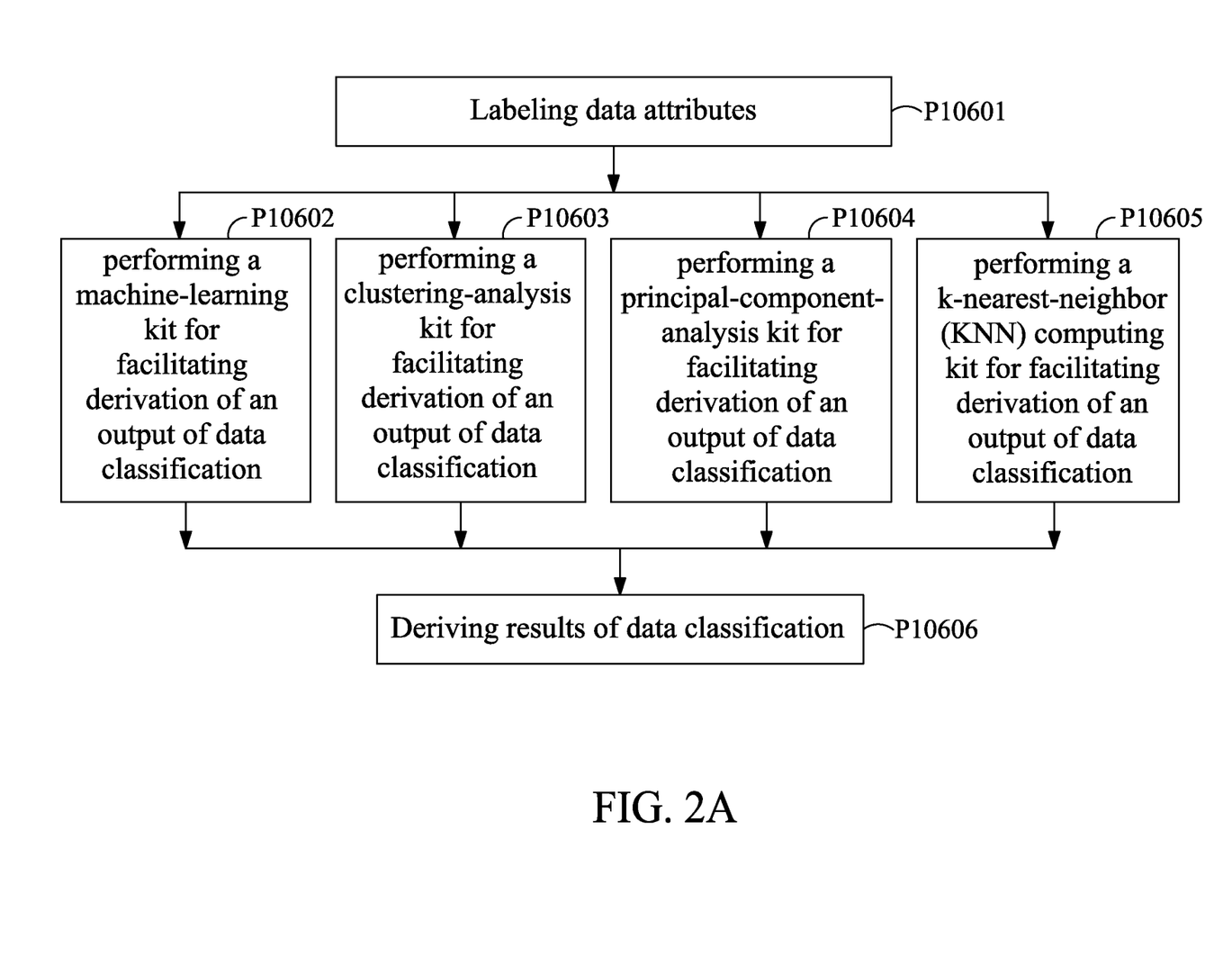
FIG. 2A is a dataflow diagram showing how the data-classification analysis engine of the present invention performs a data-classification-analysis process.

Referring to FIG. 2A, in some embodiments, in order to implement the above-mentioned data-classification-analysis process, the data-classification analysis engine (shown as block M106 in FIG. 1B) provided by the present invention further supports the following operations: a) as shown in block P10601 of FIG. 2A, labeling attributes for each user data; b) as shown in block P10602 of FIG. 2A, performing a machine-learning kit for facilitating derivation of an output of data classification; c) as shown in block P10603 of FIG. 2A, performing a clustering-analysis kit for facilitating derivation of an output of data classification; d) as shown in block P10604 of FIG. 2A, performing a principal-component-analysis kit for facilitating derivation of an output of data classification; and e) as shown in block P10605 of FIG. 2A, performing a k-nearest-neighbor (KNN) computing kit for facilitating derivation of an output of data classification; thereby the data-classification analysis engine is capable of providing results of data classification, as shown in block P10606 of FIG. 2A. Still referring back to FIG. 1A, such data-classification analysis engine M106 will be installed on the system S1000 of an end-user node (as End-User Node #1-End-User Node #3 shown in FIG. 1A) or be hooked to an end-user node for performing the data-classification-analysis process in the background system. Thereby the system drives the user-data processing module M103 collaborating with the CPU-control module M105 to utilize the data-classification analysis engine M106 for processing the user data, and then stores the processed user data in a cloud-storage block (shown as BLK01~BLK03 in FIG. 1A) implemented by the tree-structured database M101. Meanwhile the cloud-storage block is also operated together with the data-ledger module M102 and the consensus computing module M104.

Figure 3:
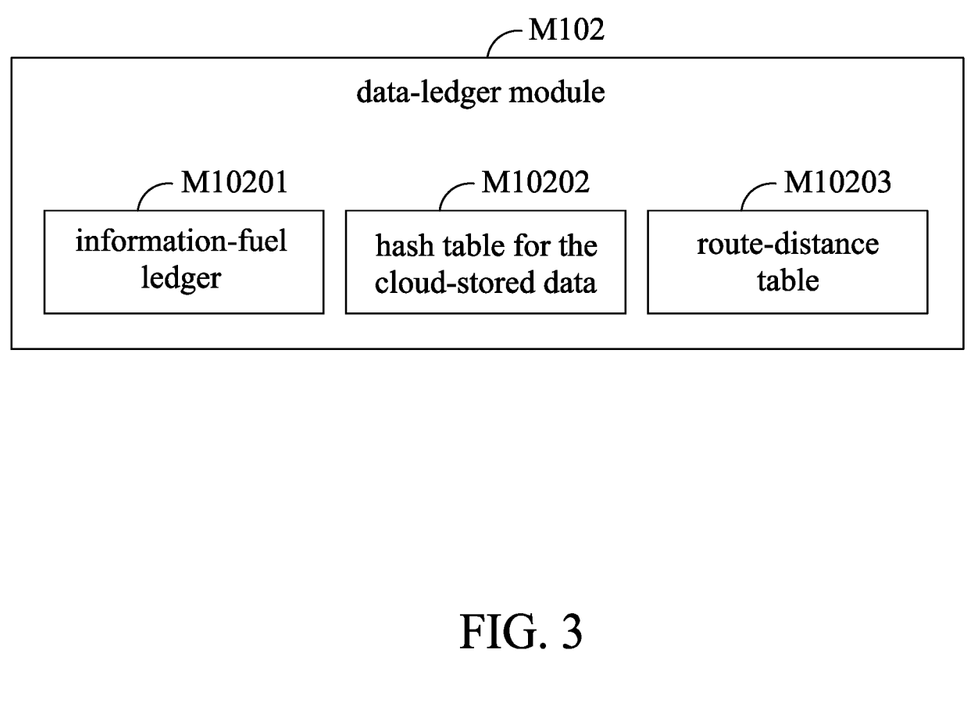
FIG. 3 is a structural block diagram of a data-ledger module of the system for use in a cloud-storage block chain solution.

Further, referring to FIG. 3, in an embodiment, in order to maintain the chained cloud-storage blocks in a decentralized way, besides maintaining a copy of the shared information-fuel ledger M10201, each data-ledger module M102 of the present invention in an end-user node of the P2P network comprises a copy of the shared hash table for the cloud-stored data M10202 and a shared route-distance table M10203 for the active end-user nodes. Moreover, the data-ledger module M102 also provides a decentralized data-ledger mechanism with the following operations: a) utilizing mutex locks for synchronization of the decentralized data-ledger mechanism during updating the information-fuel ledger M10201, the hash table for cloud-stored data M10202, and the route-distance table M10203; b) generating a random nonce as a parameter of a hash function to derive ledger IDs for each copy of the shared information-fuel ledger M10201, the shared hash table for the cloud-stored data M10202, or the shared route-distance table M10203; c) collaborating with the consensus mechanism to maintain a storage record of the P2P network with the shared hash table for the cloud-stored data M10202, to maintain an information-fuel consumption record of the P2P network with the shared information-fuel ledger M10201, and to maintain routing information of the P2P network with the shared route-distance table M10203; d) updating the shared URIs and corresponding shared URI hash values onto the shared hash table for the cloud-stored data M10202; e) updating route distances for the end-user nodes of the P2P network onto the shared route-distance table M10203, wherein the route distance is an administrator distance derived by a distance-vector algorithm coupled to an IGP (Interior Gateway Protocol, for example, a route information protocol RIPv2 with subnet masks), thus the route distance will be capable of optimizing distributions of data storage to be relative with geographical factors; and f) providing a quantum-digital-signature mechanism for data authentication, wherein the quantum digital signature is a digital fingerprint which adopts a hash value derived with a quantum random number as an input parameter of a hash function. Thereby the data related to user's shared data, information-fuel consumption records, or route distances for user's transactions (such as data-uploading transactions and data-downloading transactions) will be maintained by all of the end-user nodes together within the shared P2P network in a decentralized manner. Integrating the above operations into a decentralized data-ledger mechanism not only supports to establish a quantum block chain as a decentralized storage solution in the cloud, but also facilitates a global enterprise to set up a private cloud through an efficient way over a plurality of geographical zones, thereby performing data sharing and storage. This is an effect that cannot be achieved by prior arts.

Figure 4:
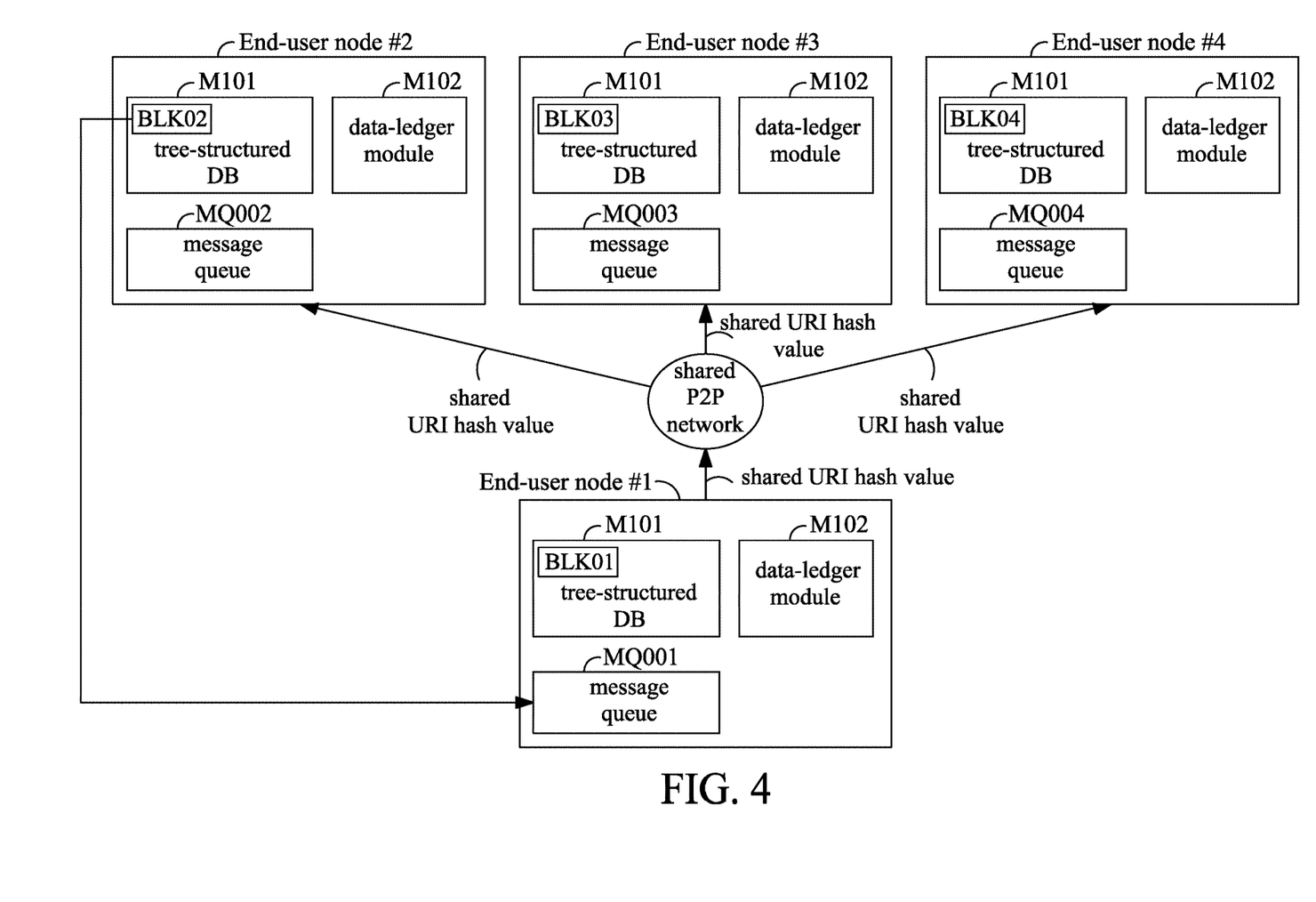
FIG. 4 is a structural block diagram of a user scenario to implement a data downloading mechanism of the system for use in a cloud-storage block chain solution.

Moreover, referring to FIG. 4, in an embodiment, in order to facilitate data-downloading transactions between the end-user nodes of the P2P network, each end-user node also provides a data downloading mechanism with the following operations: a) each end-user node (shown as End-user Node #1~End-user Node #4 in FIG. 4) maintaining a message queue (shown as MQ001~MQ004 in FIG. 4) for downloading data from a chained cloud-storage block located in a remote end-use node of the P2P network (as shown in FIG. 4, for example, downloading data from BLK02 to End-user Node #1); b) sending a request to the P2P network for data downloading with a corresponding shared URI hash value referred from the copy of the shared hash table for the cloud-stored data provided by the data-ledger module M102; c) each end-user node looking up the copy of the shared hash table for the cloud-stored data to determine whether the corresponding storage location of the received shared URI hash value is in the local tree-structured database M101; d) extracting a data from the local tree-structured database M101 according to a corresponding shared URL (for example, file://db-root/web/content/audio/mp3/resource-0012.mp3) when determining that the corresponding storage location (for example, https://BLK02/db-root/web/content/audio/mp3/resource-0012.mp3) of the received shared URI hash value is in the local tree-structured database M101, and then packaging the extracted data in the form of a message (for example, a form comprising a descriptor followed by stored data slices); and e) pushing a message to a message queue maintained by a remote end-user node (for example, shown as the message from BLK02 to MQ001 of the End-user Node #1 in FIG. 4) wherein the remote end-user node is the right one which just sent out a corresponding request for data downloading transaction. Thereby, a data downloading mechanism of the present invention is implemented for each end-user node via leveraging the data-ledger modules M102, the tree-structured databases M101 within the P2P network and the message queues bundled with the end-user nodes of the shared P2P network.

Figure 5:
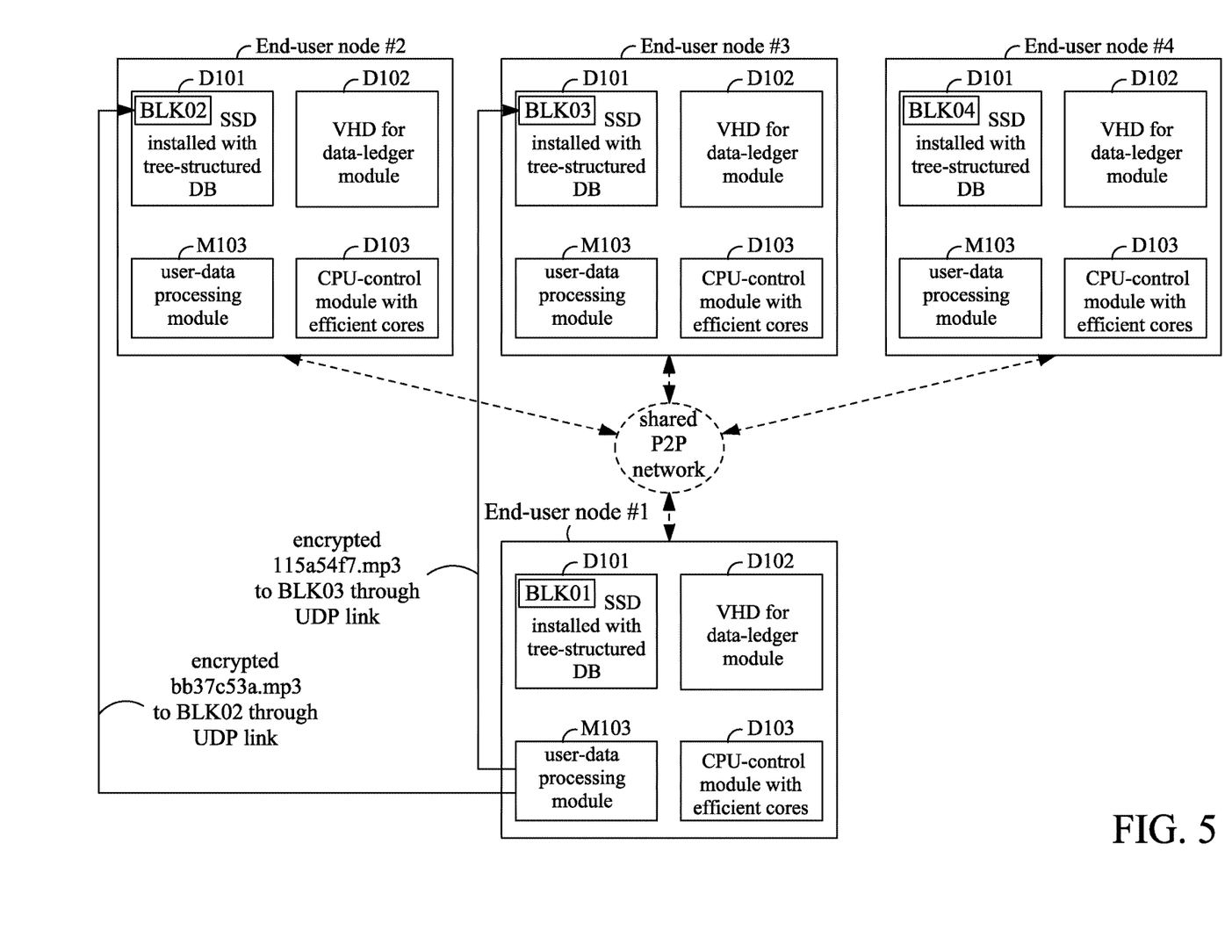
FIG. 5 is a structural block diagram of a user scenario to implement a data processing mechanism of the system for use in a cloud-storage block chain solution.

Moreover, referring to FIG. 5, in the same embodiment, in order to facilitate data-uploading transactions between the end-user nodes of the P2P network (as shown in FIG. 5, for example, uploading data from End-user Node #1 to BLK02 and BLK03), wherein the user-data processing module M103 of each end-user node also provides a data processing mechanism with the following operations: a) temporarily storing a user data in a virtual hard disk (such as D102 in End-user Node #1 shown in FIG. 5); b) triggering a single thread via corresponding CPU-control module with efficient cores (such as D103 in End-user Node #1 shown in FIG. 5) to execute a data-classification analysis process for a temporarily stored user data which is configured to be uploaded to a chained cloud-storage block of the P2P network; c) collaborating with a consensus mechanism to derive a shared URL according to the output of a data-classification analysis process wherein the shared URL is for expressing a corresponding data classification with topic hierarchy (for example, file://localhost/db-root/web/content/audio/mp3/); d) triggering a single thread to execute a data-slicing process for the temporarily stored user data after deriving its shared URL thereby getting a plurality of decentralized data slices; and e) collaborating with a consensus mechanism to derive corresponding shared URIs and shared URI hash values for the decentralized data slices; wherein the shared URI comprises the corresponding shared URL and the shared URI also points out a position on the P2P network where the position is for storing the corresponding decentralized data slice in a chained cloud-storage block (for example, https://BLK02/db-root/web/content/audio/mp3/bb37c53a.mp3 and https://BLK03/db-root/web/content/audio/mp3/115a54f7.mp3 for two data slices of a user data to be uploaded). Thereby an end-user data to be uploaded will be distributed to proper cloud-storage blocks chained within a shared P2P network after performing a proper data-classification analysis process. Taking an example, FIG. 5 shows that bb37c53a.mp3 and 115a54f7.mp3 are two data slices of a user data to be uploaded from End-user Node #1 to BLK02 and BLK03 after collaborating with a consensus mechanism.

Referring to FIG. 1B, still in the same embodiment, in order to detect a tamper event on the shared P2P network in time, the user-data processing module M103 of each end-user node further provides a tampering-resistance mechanism with the following operations: a) collaborating the data-ledger module M102 to maintain a data transaction record of the tree-structured database M101 in the local end-user node with data fingerprints in the form of hash values; and b) providing distinguishing initial-vector algorithms to the data transaction record of the tree-structured database M101 in the local end-user node and the corresponding data stored in the chained cloud-storage block; thereby the user-data processing module M103 is capable of detecting a tamper event in time via checking the data fingerprints periodically. If the authentication with fingerprints of the data transaction record does not match with the authentication with the fingerprint of the stored data, that means there is something tampered with in an event.

Still referring to FIG. 1B, for most embodiments, from the view of a user-data processing module M103, there are advanced inter-operations related to the tree-structured database M101, the data-ledger module M102, and the consensus mechanism of the shared P2P network wherein the consensus mechanism is implemented by the consensus computing modules M104. For example, after collaborating with a consensus mechanism, once the output of the consensus mechanism shows that the data slice to be uploaded has already been saved in a tree-structured database M101 of the shared P2P network, the corresponding data-uploading transaction will be canceled by the user-data processing module M103, and the local end-user node will get a corresponding shared URI hash value of the save data slice from the consensus mechanism coupled to the data-ledger module M102. However, once the output of the consensus mechanism shows a brand-new shared URI hash value for the data slice to be uploaded, the corresponding local end-user node will get a specified number of information-fuel through the consensus mechanism and each copy of the shared hash table maintained by each data-ledger module M102 within the P2P network will be updated.

Further, still referring to FIG. 1B, in some embodiments, in order to support routines for multiple cloud-storage chains within a P2P network, wherein the consensus computing module M104 of each end-user node performs a consensus mechanism with the following operations: a) collaborating with the CPU-control module M105 to determine a maximum number of end-user nodes for the P2P network; b) collaborating with the tree-structured database M101 to determine a maximum number of cloud-storage block chains for the P2P network; c) collaborating with the data-ledger module M102 to determine whether a decentralized data slice is already stored in a chained cloud-storage block; d) determining which chained cloud-storage block is arranged for a specified decentralized data slice in accordance with both of a corresponding shared URL provided by the user-data processing module M103 and the shared route-distance table maintained by the data-ledger module M102; e) planning a position of a selected tree-structured database M101 for the specified decentralized data slice in accordance with both of the corresponding shared URL and a block-ID of the arranged chained cloud-storage block wherein the block-ID is in the form of a hash value, and according to the planned position, deriving a shared URI and its corresponding shared URI hash value; f) determining an information-fuel consumption of an uploading requirement according to data size of the decentralized data slice and a corresponding route distance, wherein the route distance is referred to the route-distance table maintained by the data-ledger module M102; g) determining an information-fuel consumption of a downloading requirement according to the data size of a stored decentralized data slice and a corresponding route distance, wherein the route distance is referred to the route-distance table maintained by the data-ledger module M102; and h) determining an information-fuel bonus for an end-user node according to data size of a decentralized data slice and a corresponding route distance, wherein the end-user node provides a chained cloud-storage block to save the uploaded decentralized data slice in its tree-structured database M101. Thereby each end-user node can be operated with multiple cloud-storage chains within a shared P2P network according to system resources on hands.

Moreover, still referring to FIG. 1B, in an embodiment, in order to facilitate efficiency and security for running the cloud-storage chain solution, the CPU-control module M105 of each end-user node provides an auto-controller mechanism with the following operations: a) configuring distinguishing CPU cores for different cloud-storage block chains within a P2P network; b) running distinguishing data-classification-analysis processes for different cloud-storage block chains within a P2P network, wherein each data-classification-analysis process is performed in the background by a resident single thread bundled to an efficient core; c) collaborating with the user-data processing module M103 to keep a thread for running the data-slicing process so as to get a plurality of decentralized data slices and then temporally storing the decentralized data slices in a virtual memory located in a local disk partition; d) performing RLPx encryption on each decentralized data slice before the decentralized data slice being uploaded to a chained cloud-storage block; e) providing distinguishing RLPx keys for different cloud-storage block chains within a P2P network; and f) determining whether a decentralized data slice to be downloaded is stored in a chained cloud-storage block maintained by a remote end-user node according to a corresponding shared URI hash value. If the decentralized data slice to be downloaded is not stored in a chained cloud-storage block maintained by a remote end-user node, the local end-user node just needs to extract it from the local tree-structured database M101 without sending a downloading request to the shared P2P network.

Figure 2B:
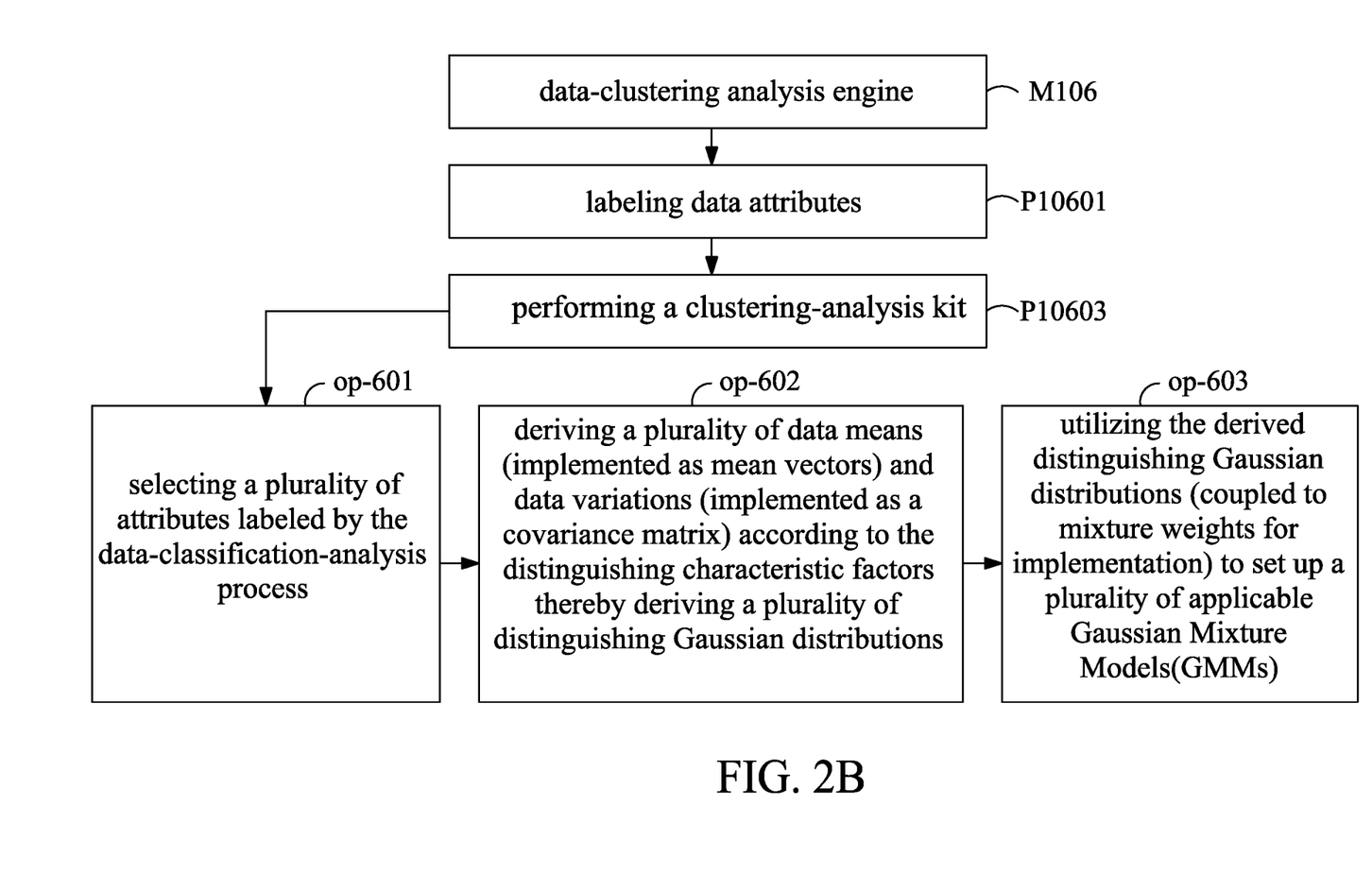
FIG. 2B is a dataflow diagram showing how the clustering-analysis kit for the data-classification analysis engine is implemented.

Further, referring to FIG. 2B, in some specific embodiments, in order to facilitate effects of a data-classification analysis engine M106 with a clustering-analysis kit, the clustering-analysis kit P10603 supports the following operations: a) as shown in block op-601 of FIG. 2B, selecting a plurality of attributes labeled by the data-classification-analysis process, wherein the selected attributes are applicable to be distinguishing characteristic factors (for example, selecting some attributes for music data, such as $\alpha_1$ with jazz characters, $\alpha_2$ with classical characters, and a 3 with rock characters); b) as shown in block op-602 of FIG. 2B, deriving a plurality of data means (implemented as mean vectors, for example, $\mu_1$ for jazz data, $\mu_2$ for classical data, and $\mu_3$ for rock data) and data variations (implemented as a covariance matrix, for example, $\Sigma_1$ for jazz model, $\Sigma_2$ for classical model, and $\Sigma_3$ for rock model) according to the distinguishing characteristic factors thereby deriving a plurality of distinguishing Gaussian distributions; and c) as shown in block op-603 of FIG. 2B, utilizing the derived distinguishing Gaussian distributions (coupled to mixture weights for implementation, for example, $\omega_1$ for jazz model, $\omega_2$ for classical model, and $\omega_3$ for rock model, wherein $\omega_1+\omega_2+\omega_3=1$) to set up a plurality of applicable Gaussian Mixture Models (GMMs, for example, $\lambda=\{\omega_i, \mu_i, \Sigma_i\}$, i=1, 2, 3), thereby facilitating a data to be treated as a specific distribution expressed by one of the applicable Gaussian Mixture Models.

While the present disclosure has been described by means of specific embodiments, numerous modifications and variations could be made thereto by those skilled in the art without departing from the scope and spirit of the present disclosure set forth in the claims.

What is claimed is:

1. A system for use in a cloud-storage chain solution, the system implementing a P2P (peer-to-peer) network including a plurality of end-user nodes, wherein the end-user nodes provide chained cloud-storage blocks as data-storage units while an end-user data stored in a cloud-storage block can be downloaded by an end-user node in accordance with an identified location of the cloud-storage block, wherein the end-user node comprises:
 a tree-structured database which is a NoSQL database with a schema in form of JSON for collaborating with a consensus mechanism, wherein the NoSQL database is also coupled to a relational database which is especially specified to deal with transactional records,
 a data-ledger module which implements a shared information-fuel ledger for data transactions,
 a user-data processing module for processing the user data via driving a single thread to perform a data-classification-analysis process on the user data, wherein the single thread is bundled to an efficient core, wherein each data-classification-analysis process is performed by the efficient core in the background at its corresponding end-user node for running a data-slicing process so as to get a plurality of decentralized data slices,
 a consensus computing module which determines an information-fuel consumption for a data transaction, wherein the consensus computing module also collaborates with a shared hash table, a shared route-distance table and an output of the data-classification-analysis process to determine which cloud-storage block is for storing the user data,
 a CPU-control module which facilitates to configure a specific efficient core to collaborate with the user-data processing module for performing the data-classification-analysis process and the data transactions, and
 a data-classification analysis engine which implements the data-classification-analysis process with the following operations:
  a) labeling attributes for each user data;
  b) performing a machine-learning kit for facilitating to derive an output of data classification;
  c) performing a clustering-analysis kit for facilitating to derive an output of data classification;
  d) performing a principal-component-analysis kit for facilitating to derive an output of data classification; and
  e) performing a k-nearest-neighbor computing kit for facilitating to derive an output of data classification;
 thereby the system drives the user-data processing module collaborating with the CPU-control module to utilize the data-classification analysis engine for processing the user data, and stores the processed user data in a cloud-storage block implemented by the tree-structured database while the cloud-storage block is also maintained by the data-ledger module and the consensus computing module.

2. The system for use in a cloud-storage chain solution according to claim 1, wherein in order to implement chained cloud-storage blocks, the tree-structured databases in the P2P network are linked with each other via UDP transmission-layer protocol, and each tree-structured database also provides a chained cloud-storage mechanism with the following operations:
 a) setting up a tree-structured topic hierarchy for a selected database;
 b) expressing a location of a data stored in the selected database with a shared URL which is a relative position in the selected database;
 c) deriving a shared URI according to the shared URL through a consensus mechanism, wherein the shared URI is an absolute position of the data stored in the selected database in the P2P network;
 d) deriving a shared URI hash value through a quantum hash function as a location ID for a data located in a chained cloud-storage block, wherein the quantum hash function provided by the consensus mechanism adopts a quantum random number as an input parameter to perform a random oracle model thereby deriving a corresponding shared hash table;
 e) requesting a number of information fuel according to the consensus mechanism for an end-user node of the P2P network when its tree-structured database accepts an uploading data transaction;
 f) collaborating with the consensus mechanism to update the shared hash table and the shared route-distance table when an end-user node is deleted from the P2P network, and
 g) collaborating with the relational database which is especially specified to deal with transactional records when a data transaction is completed or updated.

3. The system for use in a cloud-storage chain solution according to claim 2, wherein in order to maintain the chained cloud-storage blocks in a decentralized way, the data-ledger module in an end-user node of the P2P network further comprises a copy of the shared hash table and a shared route-distance table, and also provides a decentralized data-ledger mechanism with the following operations:
 a) utilizing mutex locks for synchronization of the decentralized data-ledger mechanism;
 b) generating a random nonce as a parameter of a hash function to derive ledger IDs for each copy of the shared information-fuel ledger, the shard hash table for the cloud-stored data, or the shared route-distance table;
 c) collaborating with the consensus mechanism to maintain a storage record of the P2P network with the shared hash table for the cloud-stored data, to maintain an information-fuel consumption record of the P2P network with the shared information-fuel ledger, and to maintain routing information of the P2P network with the shared route-distance table;
 d) updating the shared URIs and corresponding shared URI hash values onto the shared hash table for the cloud-stored data;
 e) updating route distances for the end-user nodes of the P2P network onto the shared route-distance table, wherein a route distance is an administrator distance derived by a distance-vector algorithm coupled to an IGP (Interior Gateway Protocol); and
 f) providing a quantum-digital-signature mechanism for data authentication, wherein the quantum digital signature is a digital fingerprint which adopts a hash value derived with a quantum random number as an input parameter of a hash function.

4. The system for use in a cloud-storage chain solution according to claim 3, wherein in order to facilitate data-downloading transactions between the end-user nodes of the P2P network, each end-user node also provides a data downloading mechanism with the following operations:

a) each end-user node maintaining a message queue for downloading data from a chained cloud-storage block located in a remote end-use node of the P2P network;

b) sending a request to the P2P network for data downloading with a corresponding shared URI hash value referred from the copy of the shared hash table;

c) each end-user node looking up the copy of the shared hash table to determine whether the corresponding storage location of the received shared URI hash value is in the local tree-structured database;

d) extracting a data from the local tree-structured database according to a corresponding shared URL when determining that the corresponding storage location of the received shared URI hash value is in the local tree-structured database, and then packaging the extracted data in a form of a message; and e) pushing a message to a message queue maintained by a remote end-user node wherein the remote end-user node is the right one which just sent out a corresponding request for data downloading transaction.

5. The system for use in a cloud-storage chain solution according to claim 3, wherein in order to facilitate data-uploading transactions between the end-user nodes of the P2P network, the user-data processing module of each end-user node also provides a data processing mechanism with the following operations:

a) temporarily storing a user data in a virtual hard disk;

b) triggering a single thread to execute a data-classification analysis process for a temporarily stored user data which is configured to be uploaded to a chained cloud-storage block of the P2P network;

c) collaborating with a consensus mechanism to derive a shared URL according to the output of a data-classification analysis process wherein the shared URL is for expressing a corresponding data classification with topic hierarchy;

d) triggering a single thread to execute a data-slicing process for the temporarily stored user data after deriving its shared URL thereby getting a plurality of decentralized data slices; and e) collaborating with a consensus mechanism to derive corresponding shared URIs and shared URI hash values for the decentralized data slices; wherein the shared URI comprises the corresponding shared URL and the shared URI also points out a position on the P2P network where the position is for storing the corresponding decentralized data slice in a chained cloud-storage block.

6. The system for use in a cloud-storage chain solution according to claim 5, wherein in order to detect a tamper event on the P2P network in time, the user-data processing module of each end-user node also provides a tampering-resistance mechanism with the following operations:

a) collaborating the data-ledger module to maintain a data transaction record of the tree-structured database in the local end-user node with data fingerprints in a form of hash values;

b) providing distinguishing initial-vector algorithms to the data transaction record of the tree-structured database in the local end-user node and the corresponding data stored in the chained cloud-storage block;

thereby the user-data processing module is capable of detecting a tamper event in time via checking the data fingerprints periodically.

7. The system for use in a cloud-storage chain solution according to claim 5, wherein in order to support routines for multiple cloud-storage chains within a P2P network, the consensus computing module of each end-user node performs a consensus mechanism with the following operations:

a) collaborating with the CPU-control module to determine a maximum number of end-user nodes for the P2P network;

b) collaborating with the tree-structured database to determine a maximum number of cloud-storage block chains for the P2P network;

c) collaborating with the data-ledger module to determine whether a decentralized data slice is already stored in a chained cloud-storage block;

d) determining which chained cloud-storage block is arranged for a specified decentralized data slice in accordance with both of a corresponding shared URL provided by the user-data processing module and the shared route-distance table;

e) planning a position of a selected tree-structured database for the specified decentralized data slice in accordance with both of the corresponding shared URL and a block-ID of the arranged chained cloud-storage block wherein the block-ID is in a form of a hash value, and according to the planned position, deriving a shared URI and its corresponding shared URI hash value;

f) determining an information-fuel consumption of an uploading requirement according to data size of the decentralized data slice and a corresponding route distance;

g) determining an information-fuel consumption of a downloading requirement according to data size of a stored decentralized data slice and a corresponding route distance; and h) determining an information-fuel bonus for an end-user node according to data size of a decentralized data slice and a corresponding route distance, wherein the end-user node provides a chained cloud-storage block to save the uploaded decentralized data slice in its tree-structured database.

8. The system for use in a cloud-storage chain solution according to claim 5, in order to facilitate efficiency and security for running the cloud-storage chain solution, wherein the CPU-control module of each end-user node provides an auto-controller mechanism with the following operations:

a) configuring distinguishing CPU cores for different cloud-storage block chains within a P2P network;

b) running distinguishing data-classification-analysis processes for different cloud-storage block chains within a P2P network, wherein each data-classification-analysis process is performed in a background by a resident single thread bundled to an efficient core;

c) collaborating with the user-data processing module to keep a thread for running the data-slicing process so as to get a plurality of decentralized data slices and then temporally storing the decentralized data slices in a virtual memory located in a local disk partition;

d) performing RLPx encryption on each decentralized data slice before the decentralized data slice being uploaded to a chained cloud-storage block;

e) providing distinguishing RLPx keys for different cloud-storage block chains within a P2P network; and f) determining whether a decentralized data slice to be downloaded is stored in a chained cloud-storage block maintained by a remote end-user node according to a corresponding shared URI hash value.

9. The system for use in a cloud-storage chain solution according to claim 1, wherein in order to facilitate effects of a data-classification analysis engine with a clustering-analysis kit, the clustering-analysis kit further supports the operations:
   a) selecting a plurality of attributes labeled by the data-classification-analysis process, wherein the selected attributes are applicable to be distinguishing characteristic factors;
   b) deriving a plurality of data means and data variations according to the distinguishing characteristic factors thereby deriving a plurality of distinguishing Gaussian distributions; and
   c) utilizing the derived distinguishing Gaussian distributions to set up a plurality of applicable Gaussian Mixture Models, thereby facilitating a data to be treated as a specific distribution expressed by one of the applicable Gaussian Mixture Models.

* * * * *